(12) United States Patent
Guest et al.

(10) Patent No.: US 8,678,100 B2
(45) Date of Patent: Mar. 25, 2014

(54) METHOD OF DEPLOYING NANOENHANCED DOWNHOLE ARTICLE

(75) Inventors: Randall V. Guest, Spring, TX (US); Soma Chakraborty, Houston, TX (US); Gaurav Agrawal, Aurora, CO (US); Don C. Cox, Roanoake, TX (US); Xiao Wei Wang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 98 days.

(21) Appl. No.: 13/229,332

(22) Filed: Sep. 9, 2011

(65) Prior Publication Data
US 2013/0062067 A1  Mar. 14, 2013

(51) Int. Cl.
*E21B 36/00* (2006.01)
*E21B 33/12* (2006.01)
*E21B 23/06* (2006.01)

(52) U.S. Cl.
USPC .............................. 166/387; 166/302; 166/386

(58) Field of Classification Search
None
See application file for complete search history.

(56) References Cited

U.S. PATENT DOCUMENTS

| 6,986,855 B1 | 1/2006 | Hood et al. | |
| 2007/0067882 A1 | 3/2007 | Atanasoska et al. | |
| 2008/0202575 A1* | 8/2008 | Ren et al. | 136/201 |
| 2008/0296023 A1* | 12/2008 | Willauer | 166/302 |
| 2009/0036605 A1* | 2/2009 | Ver Meer | 525/55 |
| 2009/0138077 A1 | 5/2009 | Weber et al. | |
| 2010/0074608 A1* | 3/2010 | Topliss | 396/133 |
| 2010/0270031 A1 | 10/2010 | Patel | |
| 2012/0065309 A1* | 3/2012 | Agrawal et al. | 524/155 |

OTHER PUBLICATIONS

Patrick T. Mather et al., "Shape Memory Polymer Research," Annu. Rev. Mater. Res.; 2009, 39: pp. 445-471.
Marc Behl et al., "Shape-memory polymers," Materialstoday; Apr. 2007, vol. 10, No. 4, pp. 20-28.
Jinsong Leng et al., "Synergic effect of carbon black and short carbon fiber on shape memory polymer actuation by electricity," American Institute of Physics, Journal of Applied Physics 104, 104917; 2008, pp. 104917-1-104917-4.
Muhammad Yasar Razzaq et al., "Thermal, electrical and magnetic studies of magnetite filled polyurethane shape memory polymers," Elsevier, Materials Science and Egineering A 444; 2007, pp. 227-235.
International Search Report and Written Opinion; International Application No. PCT/US2012/053347; International Filing Date Aug. 31, 2012; Date of Mailing: Jan. 31, 2013; 11 pages.

* cited by examiner

*Primary Examiner* — Zakiya W Bates
*Assistant Examiner* — Silvana Runyan
(74) *Attorney, Agent, or Firm* — Cantor Colburn LLP

(57) ABSTRACT

A method of deploying a downhole article comprising a shape memory material, the shape memory material comprising a nanoparticle having greater thermal conductivity than an identical shape memory material but without the nanoparticle; the method comprising heating the article while in a compacted state to change the article to a non-compacted state. A method of deploying the downhole article where the article is a packer element is also disclosed.

19 Claims, No Drawings

METHOD OF DEPLOYING NANOENHANCED DOWNHOLE ARTICLE

BACKGROUND

Shape memory materials include materials such as polyurethane foams which can be molded at a temperature above the glass transition temperature of the material, cooled to below the glass transition temperature and de-molded, and upon reheating to the glass transition temperature, the molded material deploys, regaining its original shape. Exemplary such materials include polyurethane foams, which, depending on the free volume of open cell pores in the material, are compacted to less than about 50% of the original volume and heated to lock in the pre-deployment structure. Such compacted foams can expand on heating to about 95% or greater of the original volume.

Deployment of articles for downhole use and prepared from these foams is subject to the ambient thermal condition downhole. In particular, where ambient conditions are relatively cold, and because foams are inherently good thermal insulators and therefore do not generally heat through quickly or uniformly as a function of distance from a heat source applied to one surface of a shape memory material foam, deployment may not occur consistently.

SUMMARY

The above and other deficiencies in the prior art are be overcome by, in an embodiment, a method of deploying a downhole article comprising a shape memory material, the shape memory material comprising a nanoparticle having greater thermal conductivity than an identical shape memory material but without the nanoparticle; the method comprising heating the article while in a compacted state to change the article to a non-compacted state.

In another embodiment, a method of deploying a downhole article is disclosed, the downhole article comprising a shape memory material comprising a foam comprising: a polymer; and a nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, the shape memory material having greater thermal conductivity than an identical shape memory material but without the derivatized nanoparticle; the method comprising: heating the article while in a compacted state to change the article to a non-compacted state.

In another embodiment, a method of deploying a packer element is disclosed, the packer element comprising a shape memory material comprising a foam comprising: a polyurethane; and a graphene nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, the shape memory material having greater thermal conductivity than an identical shape memory material but without the derivatized nanoparticle; the method comprising: heating the packer element while in a compacted state to change the packer element to a non-compacted state.

DETAILED DESCRIPTION OF THE INVENTION

Disclosed herein is a method of enhancing the deployment of a shape memory article in a downhole environment by inclusion of a nanoparticle with the shape memory material, and heating to deploy the article. The nanoparticle is derivatized, non-derivatized, or includes a combination of derivatized and non-derivatized nanoparticles. As used herein. "derivatized"means modified by reactive chemical functionalization of the nanoparticle prior to its inclusion with the shape memory material. Nanoparticles, such as conductive ceramics, carbon black, graphene, graphite or other nanoparticles, when included with the shape memory material, will improve the thermal conductivity of the material or improve the thermal conductivity around the material, and hence provides a mechanism for more uniform heating of an article made from the shape memory material. The inclusion of nanoparticles therefore improves thermal conductivity while also maintaining or improving desirable mechanical properties such as the modulus of the material.

A method of deploying a downhole article comprising a shape memory material having nanoparticles, thus includes heating the article while in a compacted state to change the article to a non-compacted state. Where an article, such as for example a packer element, is in its maximum possible non-compacted state based on either the capability of the article to attain a new shape, or to fit in a constrained environment such as a well bore, the article is said to be fully deployed.

The shape memory material includes a nanoparticle. Nanoparticles are particles with an average particle size (largest average dimension) of about 1 nanometer (nm) to less than about 1 micrometer ($\mu$m). In some embodiments, the nanoparticles have an average particle size of less than about 1 micrometer ($\mu$m), and more specifically a largest average dimension less than or equal to about 500 nanometer (nm), and still more specifically less than or equal to about 250 nm, where particle sizes of greater than about 250 nm to less than about 1 $\mu$m are also be referred to in the art as "sub-micron sized particles." In other embodiments, the average particle size is greater than or equal to about 1 nm, specifically 1 to about 250 nm, and more specifically about 1 to about 100 nm. In still other embodiments, the average particle size (largest dimension) of the nanoparticle is greater than or equal to 1 $\mu$m, specifically 1 to 25 $\mu$m, more specifically 1 to 20 $\mu$m, still more specifically 1 to 10 $\mu$m. As used herein, "average particle size" and "average largest dimension" can be used interchangeably, and refer to particle size measurements based on number average particle size measurements, which can be routinely obtained by laser light scattering methods such as static or dynamic light scattering (SLS or DLS, respectively). Also in an embodiment, the nanoparticles have an aspect ratio of greater than about 10, and more particularly, greater than about 50.

Useful nanoparticles include fullerenes, a nanotubes, nanographite, graphene, graphene fiber, carbon black, nanodiamonds, inorganic nanoparticles, nanoclays, metal particles, or a combination comprising at least one of the foregoing.

Nanographite is a nano-scale cluster of plate-like sheets of graphite, in which a stacked structure of one or more layers having a plate-like two dimensional structure of carbon in the form of fused hexagonal rings with an extended delocalized $\pi$-electron system, which are layered and weakly bonded to one another through $\pi$-$\pi$ stacking interaction. Nanographite has a layered structure of greater than or equal to about 50 single sheet layers, specifically greater than or equal to about 100 single sheet layers, and more specifically greater than or equal to about 500 single sheet layers.

Graphene, sometimes referred to herein as nanographene, includes both graphene having an average largest dimension of greater than or equal to 1 $\mu$m, and nanographene having an average largest dimension of less than 1 $\mu$m. Graphenes, including nanographene, are effectively two-dimensional, having a stacked structure of one or more layers of fused hexagonal rings, layered and weakly bonded to one another through π-π stacking interaction. In an exemplary embodiment, graphene has an average particle size of 1 to 5 μm, and specifically 2 to 4 μm. Graphenes have an average smallest particle size (smallest average dimension, i.e., thickness) of less than or equal to about 50 nm, more specifically less than or equal to about 10 nm, and still more specifically less than or equal to 5 nm. Graphene (including nanographene) has less than about 50 single sheet layers, specifically less than about 10 single sheet layers, and more specifically less than or equal to about 5 single sheet layers, or is as little as a single sheet thick.

Fullerenes, as disclosed herein, include any of the known cage-like hollow allotropic forms of carbon possessing a polyhedral structure. Fullerenes include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes include carbon nanotubes, inorganic nanotubes, metallated nanotubes, or a combination comprising at least one of the foregoing. Nanotubes are tubular structures having open or closed ends and which are inorganic (e.g. boron nitride) or made entirely or partially of carbon. In an embodiment, carbon and inorganic nanotubes include additional components such as metals or metalloids, which are incorporated into the structure of the nanotube, included as a dopant, form a surface coating, or a combination comprising at least one of the foregoing. Nanotubes, including carbon nanotubes and inorganic nanotubes, are single walled nanotubes (SWNTs) or multi-walled nanotubes (MWNTs).

Nanodiamonds are diamond particles having an average particle size of less than one micrometer (μm). The nanodiamonds are from a naturally occurring source, such as a by-product of milling or other processing of natural diamonds, or are synthetic, prepared by any suitable commercial method.

Nanoclays are hydrated or anhydrous silicate minerals with a layered structure and include, for example, aluminosilicate clays such as kaolins including hallyosite, smectites including montmorillonite, illite, and the like. Exemplary nanoclays include those marketed under the tradename CLOISITE® marketed by Southern Clay Additives, Inc. In an embodiment, nanoclays are exfoliated to separate individual sheets, or are non-exfoliated.

Inorganic nanoparticles include a metal or metalloid carbide such as tungsten carbide, silicon carbide, boron carbide, or the like; a metal or metalloid nitride such as titanium nitride, boron nitride, silicon nitride, or the like; a metal or metalloid oxide such as titanium oxide, alumina, silica, tungsten oxide, iron oxides, combinations thereof, or the like; or a combination comprising at least one of the foregoing.

Metal nanoparticles include, for example, those made from metals such as iron, tin, titanium, platinum, palladium, cobalt, nickel, vanadium, alloys thereof, or a combination comprising at least one of the foregoing. Ceramic nanoparticles coated with any of these metals are also useful.

In an embodiment, the nanoparticle is derivatized, non-derivatized, or includes a combination of derivatized and non-derivatized nanoparticles. In an embodiment, the nanoparticle is derivatized to include functionality for adjusting surface properties and blendability of the nanoparticles with a matrix (e.g., polymer, gel, solution, etc.). For example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups. The nanoparticles are thus derivatized to introduce chemical functionality to the nanoparticle. For example, for nanographene, the surface and/or edges of the nanographene sheet is derivatized to increase dispersibility in and interaction with the polymer matrix.

In an exemplary embodiment, the derivatized nanoparticle is graphene, a carbon nanotube, nanographite, or carbon black, and the functional groups are alkyl, aryl, aralkyl, alkaryl, functionalized polymeric or oligomeric groups, or a combination comprising at least one of the foregoing groups. In another embodiment, the derivatized nanoparticle is graphene and the functional groups are attached directly to the graphene by a carbon-carbon bond without intervening heteroatoms; by a carbon-oxygen bond; or by a carbon-nitrogen bond. Furthermore, where a blend of nanoparticles is used, the nanoparticles have the same or different particle sizes. Thus, in an exemplary embodiment, a blend of nanoscale particles of different sizes, a blend of nanoscale and micro-scale particles, or any combination thereof can be used. In a further embodiment, where different nanoparticles are used, the different nanoparticles are monodisperse, polydisperse, or any combination of monodisperse and/or polydisperse.

The shape memory material also includes, in an embodiment, a polymer foam in which the nanoparticle is dispersed throughout the polymer foam. The polymer is any polymer useful for making a shape memory material, but is not limited thereto. For example, a suitable polymers include fluoroelastomers, perfluoroelastomers, hydrogenated nitrile butyl rubber, ethylene-propylene-diene monomer (EPDM) rubber, silicones, epoxy, polyetheretherketone, bismaleimide, polyethylene, polyvinyl alcohol, phenolic resins, nylons, polycarbonates, polyesters, polyurethanes, tetrafluoroethylene-propylene elastomeric copolymers, or a combination comprising at least one of the foregoing polymers. In an exemplary embodiment, the shape memory material comprises a polyurethane foam. For example, derivatized nanoparticles, such as alkyl-modified graphene, are added to the polyol component of a shape memory polyurethane or polyurea polymer. The polyurethane/polyurea so modified, and a foam prepared from it, exhibits increased thermal conductivity, which in turn results in more even heating and improved deployment properties.

Such derivatized nanoparticle-enhance polymeric materials, and a description of the derivatized nanoparticles, are disclosed in nonprovisional U.S. patent application Ser. No. 12/878,538 filed on Sep. 9, 2010, the content of which is incorporated herein by reference in its entirety.

In another embodiment, the shape memory material includes a polymer foam, either with or without derivatized nanoparticles dispersed therein, and a gel composition comprising derivatized nanoparticles impregnated into an open cell structure of the polymer foam. Such gels include any such compositions suitable for use in downhole environments and are solvent-based gels or aqueous gels. Useful gels can include those based on, for example, gel polymers including silicones, acrylates and methacrylates, cellulosic polymers, starches, and the like, suspended in polar or nonpolar media.

In another embodiment, the shape memory material has a coating composition comprising derivatized nanoparticles disposed on a surface of the shape memory material. Such coatings can include a layer-by-layer coating entirely or partially including nanoparticles, or a composite thin layer material formed of derivatized nanoparticles dispersed in a thin-film forming material such as a polymer resin (for example, an epoxy).

Derivatized nanoparticles are included with the shape memory article in an amount of about 0.01 to about 30 wt %, in an embodiment about 0.1 to about 20 wt %, and in another embodiment, about 1 to about 15 wt %, based on the total weight of the shape memory material.

In an embodiment, heating is carried out to a temperature at about the glass transition temperature of the shape memory material. In some embodiments, heating is accomplished by ambient downhole temperature. In other embodiments, heating is accomplished by directly or indirectly contacting a downhole heating unit to the article. An exemplary heating unit for this purpose includes a cable heater, where the heating element is inserted down the drill string and positioned next to the article to be deployed. In another embodiment, heating is accomplished by hot fluid circulation downhole next to the article to be deployed. Hot fluid circulation involves, for example, piping a hot fluid down an inner string of a drill pipe to the area, and returned to a heat exchanger at the surface via an outer drill string. In another embodiment, heating is accomplished by chemical reaction, where one or more reactive chemicals are inserted down the drill string and positioned next to the article to be deployed, and the chemical reaction initiated. Any known combination of chemicals having a suitable exotherm can be used for this purpose.

It has been found that, particularly for cold bores (i.e., bores in which the downhole temperature is significantly lower than that of the deployment temperature of the shape memory article), heating the article and any intervening portion of an adjacent article (such as e.g., a base pipe, where the article is a sand filter surrounding the base pipe, and heating is effected by a cable heater inserted in the base pipe) to initiate deployment can result in overheating of the portion of the foam closest to the heat source, such as for example the foam adjacent to the base pipe surrounding the cable heater, while leaving the foam at the outermost distance from the heat source effectively unheated. It is therefore useful to have adequate thermal conductivity in the materials in which the derivatized nanoparticles are dispersed. The amount of heat transmitted to the article prepared using the shape memory material can, in this way, be managed to provide an optimum performance while mitigating any damage to the shape memory article that may be caused by excessive heating during deployment. Thus, in an embodiment, the shape memory material is heated at a rate sufficient to reach the non-compacted state without significant decomposition of the shape memory material. As used herein, "significant decomposition" is wherein greater than 20 weight percent, in an embodiment greater than 10 wt %, and in another embodiment, greater than 1 wt % of the shape memory material decomposes upon heating. In an exemplary embodiment, where the shape memory material is a polyurethane foam, heating is carried out at a rate of less than about 12 watts per square inch, in another exemplary embodiment less than about 10 watts per square inch, and in another exemplary embodiment less than about 8 watts per square inch, for a concentration of nanoparticles sufficient to ensure full deployment without significant decomposition of the polyurethane.

The article having the derivatized nanoparticle has after deploying a more uniform structure than that of an identical article but without the derivatized nanoparticle and deployed under identical conditions. Exemplary articles include a packer element, a sand filter, a blow out preventer element, a gasket, a sucker rod seal, a pump shaft seal, a tube seal, a valve seal, a seal for an electrical component, an insulator for an electrical component, a seal for a drilling motor, or a seal for a drilling bit.

In another embodiment, a method of deploying the downhole article comprising a shape memory material which includes a polymer and a nanoparticle derivatized to include functional groups disclosed herein includes heating the article while in a compacted state to change the article to a non-compacted state. In an embodiment the downhole article is a packer element or a sand filter.

In another embodiment, a method of deploying a packer element comprising a shape memory material, the shape memory material comprising a foam comprising a polyurethane; and a graphene nanoparticle derivatized to include functional groups disclosed herein includes heating the packer element while in a compacted state to change the packer element to a non-compacted state.

In an example of the method of deployment, a shape memory polymer foam cartridge arranged around a base pipe to function as a sand filter is deployed by inserting it downhole in a compacted shape, and heating it to a temperature above its activation temperature in the downhole environment. Where the downhole temperature is too low to effect deployment without heating, the shape memory polymer foam is heated by, for instance, running a cable heater to supply thermal energy indirectly to the cartridge through the wall thickness of the base pipe, which then heats the foam cartridge to allow it to expand. Because the foam is a fairly good thermal insulator, the inside of the cartridge can become significantly hotter than the outside, potentially risking the installation. However, use of a thermally conductive foam, such as that described herein and including derivatized nanoparticles provides a more uniform conduction of heat through the cartridge, and the thermal gradient from inside the foam to outside the foam is thus less, where the inside portion of the foam cartridges transferring heat to the outside portion of the foam cartridge. In another example, thermal leveling can be accomplished using compositions applied to the surface of the polymer such as a thermally conductive gel, used to fill the collapsed cells of the cartridge; or surface modification of the article by a thermally conductive coating which includes derivatized nanoparticles.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of deploying a downhole article comprising a shape memory material, the method comprising:
heating the article while in a compacted state to change the article to a non-compacted state,
wherein the shape memory material comprises:
a plurality of nanoparticles such that the shape memory material has a greater thermal conductivity than an identical shape memory material but without the nanoparticles;
a polymer foam; and
a gel composition comprising nanoparticles impregnated into an open cell structure of the polymer foam.

2. The method of claim 1, wherein the nanoparticles are dispersed throughout the polymer foam.

3. The method of claim 1, wherein the downhole article comprises the shape memory material having a coating composition comprising nanoparticles disposed on a surface of the shape memory material.

4. The method of claim 1, wherein the polymer foam comprises fluoroelastomers, perfluoroelastomers, hydrogenated nitrile butyl rubber, ethylene-propylene-diene monomer (EPDM) rubber, silicones, epoxy, polyetheretherketone, bismaleimide, polyethylene, polyvinyl alcohol, phenolic resins, nylons, polycarbonates, polyesters, polyurethanes, tetrafluoro ethylene-propylene elastomeric copolymers, or a combination comprising at least one of the foregoing polymers.

5. The method of claim 1, wherein the polymer foam is a polyurethane foam.

6. The method of claim 1, wherein the nanoparticles comprise a fullerene, a nanotube, nanographite, graphene, graphene fiber, carbon black, a nanodiamond, an inorganic nanoparticle, a nanoclay, a metal particle, or a combination comprising at least one of the foregoing.

7. The method of claim 1, wherein the nanoparticles are derivatized to include carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

8. The method of claim 7, wherein the nanoparticles comprise graphene, a carbon nanotube, nanographite, or carbon black, and the functional groups are alkyl, aryl, aralkyl, alkaryl, functionalized polymeric or oligomeric groups, or a combination comprising at least one of the foregoing groups.

9. The method of claim 8, wherein the nanoparticles are graphene, and the functional groups are attached directly to the graphene by a carbon-carbon bond without intervening heteroatoms; by a carbon-oxygen bond; or by a carbon-nitrogen bond.

10. The method of claim 1, wherein the nanoparticles are a combination of derivatized and underivatized nanoparticles.

11. The method of claim 1, wherein the nanoparticles are a combination of two or more nanoparticles having different particle sizes.

12. The method of claim 1, wherein heating is carried out to a temperature at about the glass transition temperature of the shape memory material.

13. The method of claim 1, wherein heating accomplished by ambient downhole temperature, or by directly or indirectly contacting a downhole heating unit to the article.

14. The method of claim 1, wherein heating is carried out at a rate sufficient to reach the non-compacted state without significant decomposition of the shape memory material.

15. The method of claim 1, wherein the article having the nanoparticles has after deploying a more uniform structure than that of an identical article but without the nanoparticles and deployed under identical conditions.

16. The method of claim 1, wherein the article is a packer element, a sand filter, a blow out preventer element, a gasket, a sucker rod seal, a pump shaft seal, a tube seal, a valve seal, a seal for an electrical component, an insulator for an electrical component, a seal for a drilling motor, or a seal for a drilling bit.

17. A method of deploying a downhole article comprising a shape memory material,
the method comprising:
heating the article while in a compacted state to change the article to a non-compacted state,
wherein the shape memory material comprises a foam comprising:
a polymer;
a plurality of nanoparticles which are derivatized to include functional groups including ether, ketone, alkoxy, aryl, aralkyl, alkaryl, lactone, functionalized polymeric or oligomeric groups, or a combination comprising at least one of the forgoing functional groups, the shape memory material having greater thermal conductivity than an identical shape memory material but without the derivatized nanoparticles; and
a gel composition comprising derivatized nanoparticles impregnated into an open cell structure of the polymer foam.

18. The method of claim 17, wherein the downhole article is a packer element or a sand filter.

19. A method of deploying a packer element comprising a shape memory material,
the method comprising:
heating the packer element while in a compacted state to change the packer element to a non-compacted state,
wherein the shape memory material comprises a foam comprising:
a polyurethane;
a plurality of graphene nanoparticles derivatized to include functional groups including ether, ketone, alkoxy, aryl, aralkyl, alkaryl, lactone, functionalized polymeric or oligomeric groups, or a combination comprising at least one of the forgoing functional groups, the shape memory material having greater thermal conductivity than an identical shape memory material but without the derivatized nanoparticles, and
a gel composition comprising derivatized graphene nanoparticles impregnated into an open cell structure of the polymer foam.

* * * * *